Figure 1:
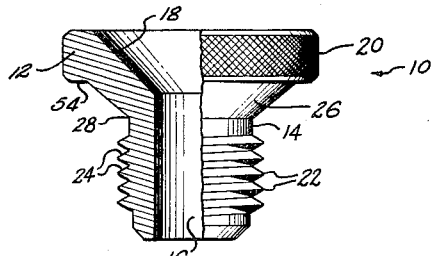

Sept. 7, 1965        H. H. MERRIMAN        3,204,284

THREADED BUSHING INSERT

Filed Oct. 31, 1963

INVENTOR

HENRY H. MERRIMAN

BY Beaman & Beaman

ATTORNEYS

United States Patent Office 3,204,284
Patented Sept. 7, 1965

3,204,284
THREADED BUSHING INSERT
Henry H. Merriman, 751 W. Washington St.,
Jackson, Mich.
Filed Oct. 31, 1963, Ser. No. 320,351
10 Claims. (Cl. 16—2)

The invention pertains to a bushing insert, and particularly relates to a bushing insert adapted to be affixed within a bushing by threads.

Drill guide bushings have long been a standard means for guiding drills during drilling operations. Such bushings are mounted in jigs, templates, or drill fixtures, and are provided with a guide bore through which the drill extends to locate the drill relative to the workpiece during the drilling. These types of bushings require considerable maintenance and replacement in that the guide bore will wear and enlarge, resulting in inaccurate drilling.

To overcome the aforementioned bushing replacement, and the expenses involved in such replacement and maintenance, the invention is directed to a bushing insert which is mounted within the bushing and may be easily installed and removed therefrom. The bushing insert is provided with a drill guide bore and, thus, only the bushing insert wears due to engagement with the drill, and the expense of replacing the bushing and removing the bushing from the jig or fixture is eliminated. In accord with the invention, the bushing insert is provided with threads mounted upon the exterior surface thereof which engage with threads defined within the bushing. Centering means are located upon the bushing insert whereby upon fully assembling the bushing insert within the bushing, the centering means of the bushing and bushing insert cooperate to accurately center the bushing insert within the bushing, thereby maintaining the accuracy of the drill position. Therefore, it is an important object of the invention to provide a bushing insert and bushing assembly wherein the bushing insert may be easily removed from, or assembled to the bushing, and wherein a very accurate concentric relationship between the bushing and bushing insert may be maintained.

A further object of the invention is to provide a bushing insert and bushing assembly wherein the bushing insert may be very accurately, concentrically related within the bushing, and permissible manufacturing tolerance variations occurring during the fabrication of the bushing and bushing insert will not adversely affect the concentric assembly thereof.

A further object of the invention is to provide a bushing insert and bushing assembly wherein the bushing insert may be assembled within the bushing from only one "side" of the bushing.

It is becoming commonplace to employ synthetic plastic or fiberglas templates or fixtures for drill guide purposes. Such synthetic templates include a hardened metal bushing molded in place at a predetermined location and, due to the thermoplastic nature of the synthetic plastic, the heat generated during the drilling operation often adversely affects the molded assembly of the bushing and the template material. It is, therefore, an object of the invention to provide a bushing insert which may be employed with a bushing molded into a synthetic plastic template or fixture, wherein the transfer of heat from the bushing insert to the bushing is minimized.

Figure 2:
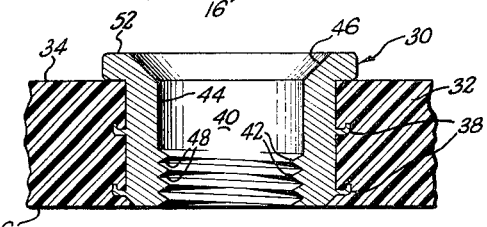
Figure 3:
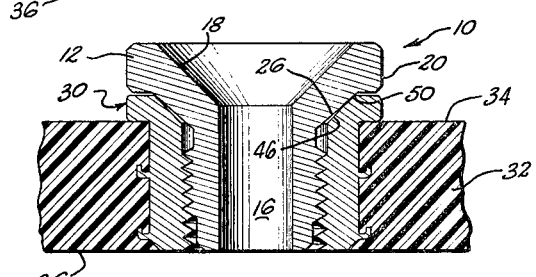
Figure 4:
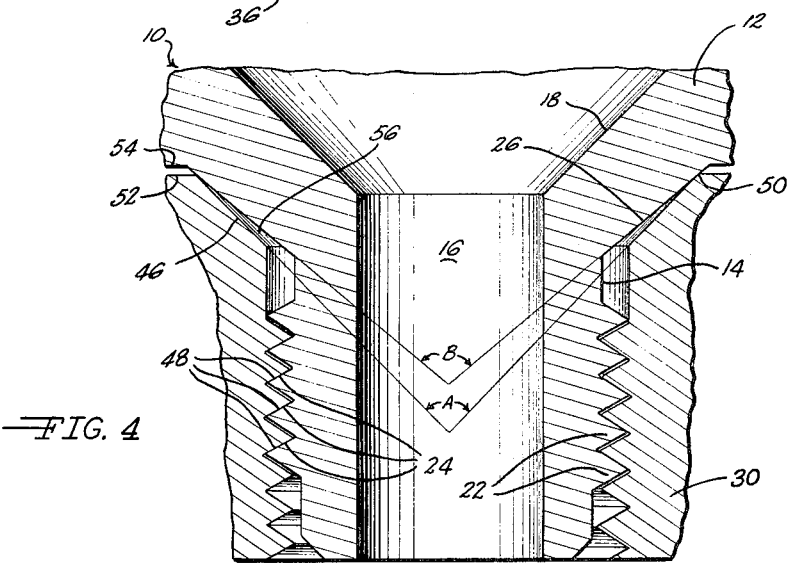

These and other objects of the invention arising from the details and relationships of the components of an embodiment thereof will be apparent from the following description and accompanying drawings wherein:

FIG. 1 is an elevational view, partly sectioned, of a bushing insert in accord with the invention, FIG. 2 is an elevational, diametrical, sectioned view of a bushing used in combination with the bushing insert of FIG. 1, FIG. 3 is an elevational, diametrically sectioned view of a bushing insert and bushing in accord with the invention as fully assembled, and FIG. 4 is an enlarged, elevational, detail, sectioned view of bushing insert and bushing shown in the fully assembled relationship.

The configuration of a bushing insert in accord with the invention will be appreciated from FIG. 1. The bushing insert 10 includes an annular body 12 having a substantially cylindrical, exterior surface 14. The annular body 12 is provided with a drill guide bore 16 extending therethrough, and the exterior surface 14 and the annular configuration of the body are concentrically related to the longitudinal axis of the guide bore. The outer portion of the guide bore is countersunk at 18 to facilitate entry of a drill into the bore. The body 12 is also provided with an enlarged head 20, having an exteriorly knurled periphery permitting the insert to be easily gripped and rotated.

Threads 22 are defined on the exterior of the body 12 extending from the surface 14. As will be apparent from the drawings, the threads 22 are of the V-type wherein the flanks of the threads defined on common sides of the thread apex converge in a common direction. For instance, the "outer" thread flanks 24, FIG. 4, of the threads 22 converge toward the axis of the bore 16 and toward the head 20. A conical centering surface 26 is also defined on the exterior of the annular body 12 in an axially spaced relation to the threads 22 and intersecting the exterior surface 14 at the shoulder 28, FIG. 1. The centering surface 26 is accurately located on the body 12 so as to be concentrically related to the longitudinal axis of the bore 16.

The bushing 30, with which the bushing insert 10 is associated, is shown alone in FIG. 2. The bushing 30 is illustrated as being molded within a synthetic plastic template or fixture 32. The template 32 may be considered to have an outer surface 34 and an inner surface 36 disposed toward the workpiece being drilled. The bushing 30 is of an annular configuraiton, and is provided with projections 38 on its outer surface so as to strengthen the connection between the bushing and the template material. In this respect the general outer configuration of the bushing 30 and the form of the projections 38 may be identical to that shown in my United States Patent No. 3,104,136. The bushing 30 is longitudinally provided with a bore 40 in which threads 42 are defined. If desired, the bore 40 may be reamed as at 44 for clearance purposes. It will be appreciated that the bushing 30 is very accurately located on the template 32 during the manufacture of the template, and that the longitudinal axis of the bushing bore 40 coincides with the center line of the hole to be drilled. The outer end of the bushing 30 is provided with a countersunk conical centering surface 46 which intersects the reamed surface 44. The conical centering surface 46 is very accurately located upon the bushing 30 as to be concentric to the longitudinal axis of the bushing bore 40. The threads 42 are also of the V-type and include flanks 48 which substantially define conical surfaces converging toward the axis of bore 40 and toward the centering surface 46.

Assembly of the bushing insert 10 within the bushing 30 is accomplished by simply inserting the threaded body portion of the bushing insert into the bushing bore 40. Rotation of the bushing insert 10 in a clockwise direction relative to the bushing threads the bushing insert into the bushing threads and upon fully assembling the bushing insert and bushing, the surfaces 26 and 46 will engage.

Upon threading the bushing insert 10 into the bushing bore 40 as far as possible, the surface 26 will engage the surface 46 at an annular contact line 50. The contact line 50 occurs at the intersection of the conical surface 46 and the bushing outer surface 52. Annular line contact between the surfaces 26 and 46 is assured in that the included angle A, FIG. 4, defined by the conical surface 46, is less than the included angle B, defined by the conical surface 26. The forming of the conical surfaces 26 and 46 is such that the permissible manufacturing tolerances of the included angles of the surfaces 26 and 46 assure line contact between the surfaces upon the bushing and bushing insert being fully assembled. By way of example, the angle A may be 90° with a plus tolerance of 0° and a minus tolerance of 6°. When angle A is formed in accordance with the foregoing, the angle B, for instance, may be of 100° having a plus tolerance of 0° and a minus tolerance of 6°. Thus, by regulating the manufacturing tolerances of the angles A and B, line contact between the surfaces 26 and 46 will always be assured.

As the surface 46 is concentric to the longitudinal axis of the bushing bore 40 and the conical surface 26 is concentric to the longitudinal axis of the bushing insert drill guide bore 16, the line contact between the surfaces 26 and 46, and the axial force produced by the threads 22 and 42 maintaining engagement of the surfaces 26 and 46, will accurately "center" the bushing insert 10 relative to the bushing 30. This accurate alignment between the bushing insert and the bushing is determined by the surfaces 26 and 46, and the class of fit of the threads 22 and 42 is not of major concern. While the most important function of the threads 22 and 24 is to produce an axial "pull" on the bushing insert 10 which will produce a continuous annular contact line 50, the use of V-type threads, or threads having conical portions, is of value in aiding in the concentricity of the bushing insert and bushing. The conical shape of the engaged thread flanks 24 and 48 tends to "center" the inner portion of the bushing insert nearest the template inner surface 36 at a location axially spaced from the contact line 50 and, thus, the V-type threads contribute to the concentricity of the assembly.

It will be appreciated that the rotation of the drill is such as to tend to tighten the bushing insert 10 within the bushing 30 and, thus, there is not tendency for the drill to loosen the assembly between the bushing insert and bushing.

As will be appreciated from FIGS. 3 and 4, although the bushing insert 10 is firmly assembled within the bushing 30, the actual engagement between the bushing insert and bushing is relatively limited. Direct contact occurs only at the annular contact line 50 and the flanks 24 of the threads 22 and the flanks 48 of the threads 42, as will be apparent from FIG. 4. It is also to be noted that lower surface 54 of the insert head 20 does not engage the bushing surface 52, and the insert head does not interfere with the bushing and insert assembly. Thus, due to the limited contact between the bushing insert and the bushing, the transfer of heat generated during the drilling operation from the bushing insert to the bushing is minimized, preventing the bushing 30 from becoming so hot that it will melt the template material adjacent the bushing and adversely affect the interconnection between the bushing and the template. An air gap exists at 56 intermediate the surfaces 26 and 46, and the presence of this and the other air gaps between the bushing insert and the bushing aids in reducing the heat transfer from the insert to the bushing.

Although the bushing insert is usually constructed of a hardened steel alloy to provide long wear characteristics, the drill guide bushing insert bore 16 will become enlarged during the course of use, and replacement of the bushing insert may be simply accomplished by unthreading the bushing insert from the bushing bore 40 and rethreading a new bushing insert into the bushing. Such maintenance is simplified in that the bushing insert may be replaced from the "front" or outer side of the template and requires no attention from the side of the template adjacent the workpiece being drilled. It will be appreciated that the bushing insert 10 will permit various size drill guide bushing inserts to be used with a common bushing merely by employing bushing inserts having different diameters of drill guide bores 16.

The fact that the conical surface 26 is axially spaced relative to the threads 22 and the conical surface 46 is axially spaced relative to the threads 42 spaces the contact between the bushing insert 10 and the bushing 30 in an axial manner to produce a very firm and accurate assembly.

It will be understood that various modifications to the invention may be apparent to those skilled in the art without departing from the spirit and scope thereof, and it is intended that the invention be defined only by the scope of the following claims.

I claim:
1. A bushing and drill bushing insert assembly comprising, in combination,
   (a) a bushing having a bore extending therethrough having a longitudinal axis,
   (b) threads defined in said bore,
   (c) first centering means defined on said bushing concentric with respect to said bore longitudinal axis,
   (d) a bushing insert having a bore defined therethrough having a longitudinal axis,
   (e) threads defined on the exterior of said bushing insert adapted to mate with the threads within said bushing bore upon said bushing insert being assembled within said bushing bore, and
   (f) second centering means defined on said bushing insert concentric with respect to the longitudinal axis of said bushing insert bore, said first and second centering means cooperatively engaging upon fully assembling said bushing insert within said bushing bore centering said bushing insert bore with respect to said bushing bore wherein the axes thereof coincide.

2. A bushing and drill bushing insert assembly comprising, in combination,
   (a) a bushing having a bore extending therethrough having a longitudinal axis,
   (b) threads defined in said bore,
   (c) first centering means defined on said bushing concentric with respect to said bore longitudinal axis and axially spaced with respect to said threads,
   (d) a bushing insert having a bore defined therethrough having a longitudinal axis,
   (e) threads defined on the exterior of said bushing insert adapted to mate with the threads within said bushing bore upon said bushing insert being assembled within said bushing bore, and
   (f) second centering means defined on said bushing insert concentric with respect to the longitudinal axis of said bushing insert bore and axially spaced with respect to said threads defined on said bushing insert, said first and second centering means cooperatively engaging upon fully assembling said bushing insert within said bushing bore centering said bushing insert bore with respect to said bushing bore wherein the axes thereof coincide.

3. In a bushing and drill bushing insert assembly as in claim 2, wherein,
   (a) said first centering means consists of a first conical surface defined on said bushing,
   (b) said second centering means consists of a second conical surface defined on said bushing insert, and
   (c) said threads defined on said bushing and bushing insert are of a V-configuration.

4. In a bushing and drill bushing insert assembly as in claim 3, wherein,
   (a) the included angle of said first and second conical surfaces are dissimilar whereby annular line contact occurs between said conical surfaces upon fully assembling said bushing insert within said bore of said bushing.

5. A bushing and bushing insert assembly comprising, in combination,
(a) a bushing having a bore extending therethrough having a longitudinal axis,
(b) a countersunk conical surface defined on said bushing intersecting said bore and concentric to said longitudinal axis,
(c) threads defined in said bore axially spaced from said conical surface,
(d) a bushing insert having a bore defined therethrough having a longitudinal axis,
(e) threads defined on the exterior of said bushing insert adapted to mate with the threads within said bushing bore upon said bushing insert being assembled within said bushing bore, and
(f) a conical surface defined on the exterior of said bushing insert concentric to said bushing insert bore longitudinal axis and axially spaced from said bushing insert threads, said bushing insert conical surface being adapted to contact said bushing conical surface upon fully assembling said bushing insert within said bushing bore to concentrically align said bushing insert relative to said bushing.

6. In a bushing and bushing insert assembly as in claim 5, wherein,
(a) the included angle defined by said countersunk conical surface is less than the included angle defined by said bushing insert conical surface wherein said conical surfaces engage in an annular contact line.

7. A drill bushing insert comprising, in combination,
(a) an annular body having an exterior surface,
(b) a guide bore concentrically extending through said body having a longitudinal axis,
(c) threads defined on said annular body exterior surface, and
(d) centering means defined on said annular body concentrically related to said bore longitudinal axis and axially spaced from said threads.

8. A drill bushing insert comprising, in combination,
(a) an annular body having an exterior surface,
(b) a guide bore concentrically extending through said body having a longitudinal axis,
(c) V-shaped threads defined on said annular body exterior surface, and
(d) centering means defined on said annular body concentrically related to said bore longitudinal axis and axially spaced from said threads.

9. A drill bushing insert comprising, in combination,
(a) an annular body having an exterior surface,
(b) a guide bore concentrically extending through said body having a longitudinal axis,
(c) threads defined on said annular body exterior surface, and
(d) a conical surface defined on the exterior of said annular body in axially spaced relation to said threads and concentrically related to said bore longitudinal axis.

10. A drill bushing insert comprising, in combination,
(a) an annular body having an exterior surface,
(b) a guide bore concentrically extending through said body having a longitudinal axis,
(c) V-shaped threads defined on said annular body exterior surface, and
(d) a conical surface defined on the exterior of said annular body in axially spaced relation to and converging toward said threads, said conical surface intersecting said body exterior surface and concentrically related to said bore longitudinal axis.

References Cited by the Examiner
UNITED STATES PATENTS

| | | | |
|---|---|---|---|
| 1,235,184 | 7/17 | Casbarian | 16—2 |
| 1,822,887 | 9/31 | Hagstedt | 16—2 |
| 1,882,021 | 10/32 | Lauer | 16—2 |
| 3,076,668 | 2/63 | Famely | 16—2 |

DONLEY J. STOCKING, *Primary Examiner.*